(12) United States Patent
Nishiyama (10) Patent No.: US 8,334,945 B2
(45) Date of Patent: Dec. 18, 2012

(54) LIQUID CRYSTAL DISPLAY DEVICE

(75) Inventor: Seiichi Nishiyama, Mobara (JP)

(73) Assignees: Hitachi Displays, Ltd., Chiba-ken (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 1157 days.

(21) Appl. No.: 12/007,091

(22) Filed: Jan. 7, 2008

(65) Prior Publication Data

US 2008/0170174 A1 Jul. 17, 2008

(30) Foreign Application Priority Data

Jan. 12, 2007 (JP) .................... 2007-003977

(51) Int. Cl.
*G02F 1/1335* (2006.01)
*F21V 7/04* (2006.01)
(52) U.S. Cl. .......... 349/65; 362/609; 362/610; 362/612; 362/615
(58) Field of Classification Search .............. 349/61–62, 349/65; 361/679.21, 714, 752; 362/608, 362/633, 609–613, 615
See application file for complete search history.

(56) References Cited

U.S. PATENT DOCUMENTS

| 5,521,797 | A  | * | 5/1996  | Kashima et al. | 362/617 |
|-----------|----|---|---------|----------------|---------|
| 6,411,353 | B1 | * | 6/2002  | Yarita et al.  | 349/59  |
| 6,825,894 | B2 | * | 11/2004 | Aoyagi et al.  | 349/61  |
| 6,942,374 | B2 | * | 9/2005  | Lee            | 362/615 |
| 2006/0056200 | A1 | * | 3/2006 | Yamashita et al. | 362/620 |
| 2007/0008739 | A1 | * | 1/2007 | Kim et al.     | 362/612 |

FOREIGN PATENT DOCUMENTS

JP 2005-251687 3/2004

* cited by examiner

*Primary Examiner* — Uyen Chau N Le
*Assistant Examiner* — Michael Mooney
(74) *Attorney, Agent, or Firm* — Stites & Harbison, PLLC; Juan Carlos A. Marquez, Esq

(57) ABSTRACT

The present invention provides a liquid crystal display device having a back light for irradiating a liquid crystal panel with light. An LED as a light emitting element is provided on a light guide panel provided in the back light, and a reflection member is provided on an optical sheet in the vicinity of an inclined plane of the light guide panel to reflect the light going out of the inclined plane toward the light guide panel. Furthermore, a convex portion of the light guide panel is formed between a plurality of light emitting elements, and an adhesive member is also provided between the convex portion and the optical sheet to ensure tight adhesion between the light guide panel and the optical sheet.

12 Claims, 12 Drawing Sheets

LIQUID CRYSTAL DISPLAY DEVICE

CLAIM OF PRIORITY

The present application claims priority from Japanese Application JP 2007-003977 filed on Jan. 12, 2007, the content of which is hereby incorporated by reference into this application.

BACKGROUND OF THE INVENTION

1. Field of the Invention

The present invention relates to a light source for a non-self-luminous display device, and more particularly to a liquid crystal display device having a light guide panel and a back light using an LED as a light source.

2. Description of the Related Art

Recently, liquid crystal display devices are widely used as display devices. Since the liquid crystal display devices are especially thin, light, and thrifty in power consumption, they are often used as display sections of portable devices.

However, since the liquid crystal display device is not self-luminous, a lighting means is required. A planar lighting unit called a "back light" is generally used as a lighting unit for the liquid crystal display device. Cold cathode discharge tubes have been used as light-emitting elements (also referred to as light sources) heretofore; recently, LEDs (light emitting diodes) are also used as light-emitting elements.

A plate-like light guide panel is provided in a back light. The light guide panel is made of translucent resin or the like, and light entering the light guide panel from a light-emitting element propagates through the light guide panel. Provided in the light guide panel are light-reflective and dispersal members such as grooves, projections, or printed materials. The light propagating through the light guide panel by these light-reflective and dispersal members goes out of the light guide panel toward the liquid crystal display device side.

When an LED is used as a light emitting element, an FPC (Flexible Printed Circuit) for supplying power to the LED is required. To make the width of a frame of a back light (the width of a non-light-emitting area) smaller, it is required that a portion of the FPC be overlaid on the light guide panel. When the FPC is overlaid on the light guide panel, however, there arises a problem that a color of the FPC is mixed with colors on a screen. In response to the above problem, a configuration in which a light blocking material is provided on an FPC is disclosed, for instance, in JP-A-2005-251687.

SUMMARY OF THE INVENTION

To make smaller the frame width of the back light (the width of an area where light is not emitted), it is required that a portion of the FPC is overlaid on the light guide panel. Because of the configuration, there arises a problem that light coming out of the LED or the light guide panel is absorbed by the FPC, resulting in lowered brightness of the back light.

Provided in a liquid crystal display device are a display panel, a back light for irradiating the display panel with light, a light emitting element provided in the back light, a light guide panel into which light from the light emitting element is introduced, and a circuit board on which the light emitting element is mounted. Furthermore, an optical sheet is placed on the light guide panel, a colored area formed with a reflective member is provided in a portion of the optical sheet, and the colored area is provided between the light guide panel and the circuit board.

The circuit board on which the light emitting element is mounted and the optical sheet are fixed to each other with an adhesive, and the light emitting element is positioned with respect to the optical sheet.

Because of the configuration according to the present invention in which the optical sheet is provided on the light guide panel, the colored area formed with a reflective member is provided in a portion of the optical sheet, and the colored area is provided between the light guide panel and the circuit board on which the light emitting element is provided, the light absorbed in the circuit board can be guided to the light guide panel side.

DESCRIPTION OF THE PREFERRED EMBODIMENTS

Concerning a liquid crystal display device having a liquid crystal panel and a planar lighting unit for irradiating the liquid crystal panel with light, a light guide panel having a light outgoing face and a bottom face opposite to the light outgoing face is provided in the planar lighting unit. Furthermore, provided in the light guide panel is a side face intersecting with the light outgoing face or the bottom face, and an LED is provided along a first side face of the light guide panel. A light beam from the LED is introduced from the first side face so that the first side face is defined as a light incoming face of the light guide panel. Furthermore, an LED is mounted on a circuit board.

An optical sheet is provided on the light outgoing face of the light guide panel, a colored area is provided in a portion of the optical sheet, and the colored area is provided between the light guide panel and the optical sheet.

First Embodiment

Figure 1:
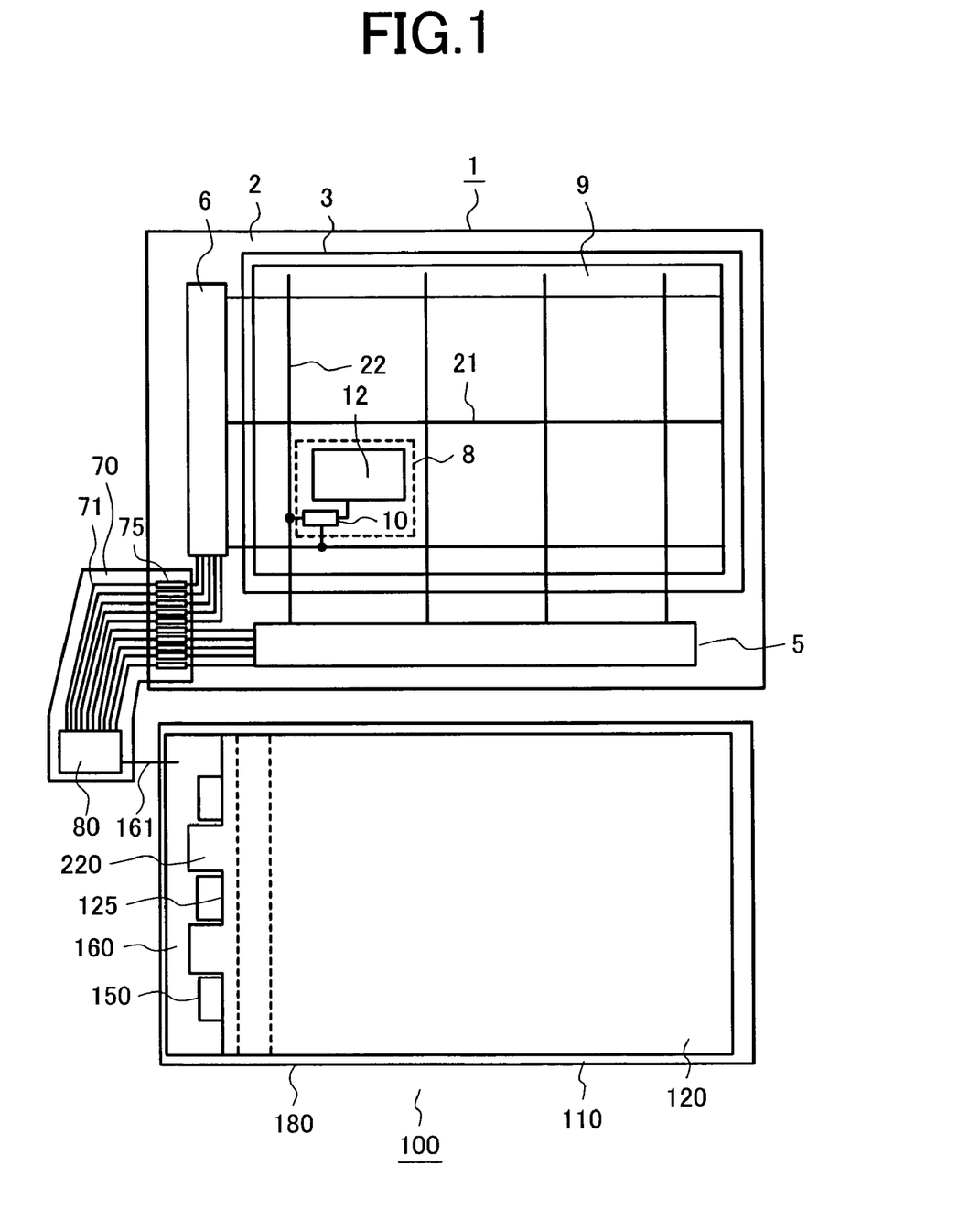
FIG. 1 is a schematic block diagram illustrating a configuration of a liquid crystal display device according to an embodiment of the present invention.

FIG. 1 is a plan view illustrating a liquid crystal display device 100 according to the present invention. The liquid crystal display device 100 comprises a liquid crystal panel 1, a back light 110, and a control circuit 80. Signals required for display on the liquid crystal display device 100 and a power voltage are supplied from the control circuit 80. The control circuit 80 is mounted on a flexible substrate 70, and signals are delivered to the liquid crystal panel 1 via wiring 71 and a terminal 75.

The back light 110 comprises a light guide panel 120, an LED 150, and a housing 180. The back light 110 is provided to irradiate the liquid crystal panel 1. In the liquid crystal panel 1, displays are provided by controlling an amount of transmitted light or reflected light which is radiated from the back light 110. The back light 110 is provided in an overlaid state on the back side or the front side of the liquid crystal panel 1 when viewed from a viewer, but in FIG. 1, the back light 110 is juxtaposed with the liquid crystal panel 1 for a clarification purpose.

The light guide panel 12 has a substantially rectangular form, and the LED 150 is provided on a side face of the light guide panel 120. Reference numeral 160 denotes a flexible substrate for electrical connection among a plurality of LEDs 150. The flexible substrate 160 and the control circuit 80 are electrically connected to each other by wiring 161.

A face of the light guide panel on which the LED 150 is mounted is referred to as a "light incoming plane", and light from the light incoming plane 125 goes into the light guide panel 120. A convex portion 220 (also referred to "projecting portion") is provided between two adjoining LEDs 150. This convex portion 220 is described in detail hereinafter.

Next, the liquid crystal panel 1 is described. The liquid crystal panel 1 has two substrates, namely a TFT substrate 2 and a color filter substrate 3, and a liquid crystal composition is held between the overlaid two substrates. A pixel electrode 12 is provided in a pixel section 8 of the TFT substrate 8. The liquid crystal panel 1 has a number of pixel sections 8 provided in a matrix state, but in FIG. 1, only one pixel section 8 is shown to evade complexity. The pixel sections 8 provided in the matrix state forms a display area 9. Each of the pixel sections 8 plays a role of a pixel of a displayed image to display an image on the display area 9.

Also shown in FIG. 1 are gate signal lines 21 (also referred to as scan line) extending in the X-axial direction and provided in parallel to each other in the Y-axial direction and drain signal lines 22 (also referred to as video signal line) extending the Y-axial direction and provided in parallel to each other in the X-axial direction; the gate signal line 21 and drain signal line 22 intersect with each other. The pixel section 8 is formed in an area surrounded by the gate signal line 21 and the rain signal line 22.

A switching element 10 is provided in the pixel section 8. Control signals are supplied from the gate signal line 21 to turn ON/OFF the switching element 10. When the switching element 10 is turned ON, a video signal transmitted via the drain signal 22 is supplied to the pixel electrode 12.

The drain signal line 22 is connected to a drive circuit 5, and a video signal is output from the drive circuit 5. The gate signal line 21 is connected to a drive circuit 6, and a control signal is output from the drive circuit 6. The gate signal line 21, the drain signal line 22, and the drive circuits 5 and 6 are formed on the same TFT substrates 2. A configuration is also allowable in which the drive circuits 5 and 6 and the control circuit 80 are formed on the same semiconductor chip.

Figure 2A:
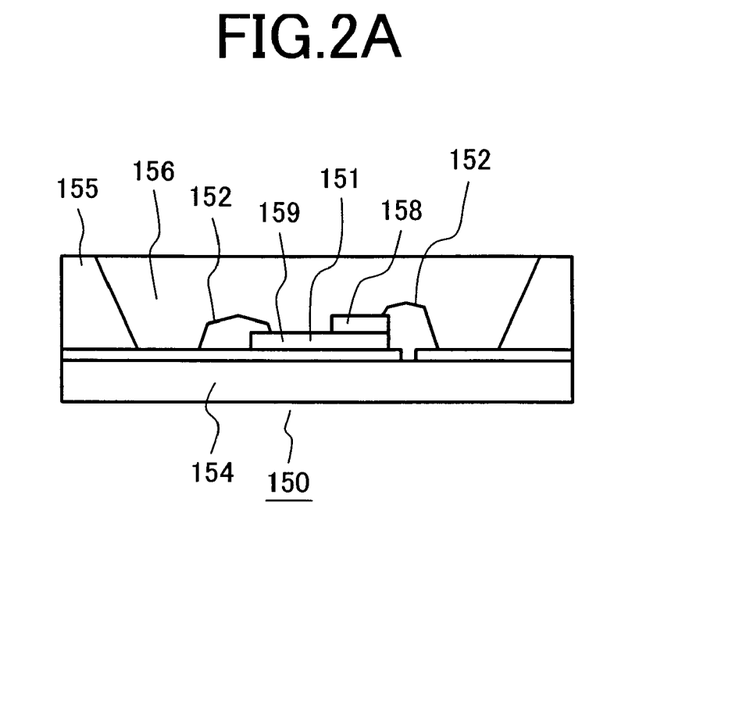
FIGS. 2A and 2B are schematic block diagrams illustrating a light-emitting diode of the liquid crystal display device according to the embodiment of the present invention.
Figure 2B:
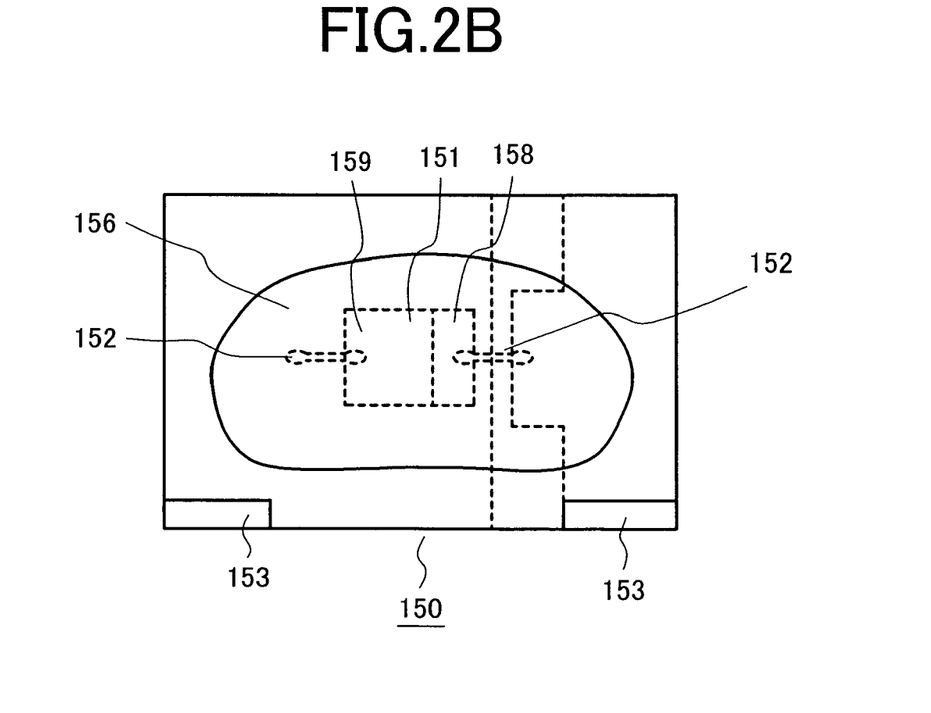

FIG. 2 is a schematic block diagram illustrating the LED 150 which is a light-emitting element. FIG. 2A is a schematic cross-section illustrating the same, and FIG. 2B is a front view illustrating the LED 150 viewed from the light outgoing plane side.

The LED 150 has a structure in which an LED 151, a light-emitting section, is mounted on a chip substrate 154. The LED chip 151 has a p-n junction, and when a voltage is applied to the p-n junction, light having a particular wavelength is output. A p electrode (anode) 158 is provided on a p-type semiconductor layer, and an n electrode (cathode) 159 is provided on an n-type semiconductor layer, which layers constitute the p-n junction.

The p electrode 158 and the n electrode 159 are connected to each other via a wire 152. The wire 152 electrically connects a chip terminal 153 provided to connect the LED 150 to the outside to the p electrode 158 as well as to the n electrode 159.

In some cases, a fluorescence emitting section 156 may be provided on the light outgoing plane side of the LED chip 151. The fluorescence emitting section 156 has a function of converting a wavelength of light emitted from the LED chip 151. Reference numeral 155 denotes a reflection section which reflects light forward.

Figure 3A:
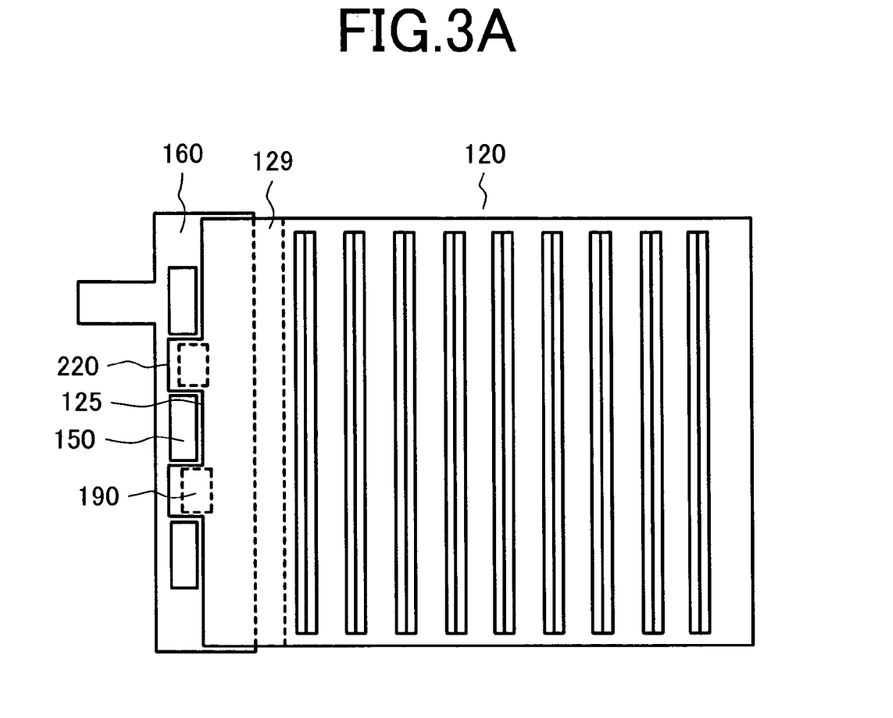
FIGS. 3A and 3B are schematic block diagrams illustrating a light guide panel of the liquid crystal display device according to the embodiment of the present invention.
Figure 3B:
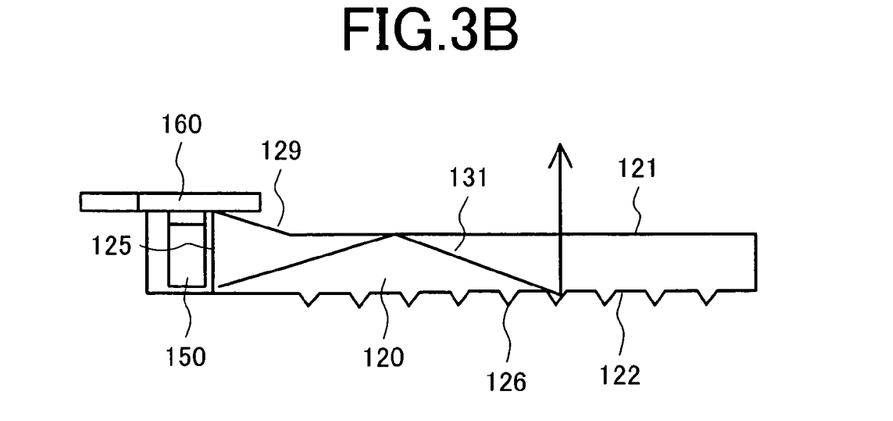

FIG. 3A is a schematic plan view of the light guide panel 120 while FIG. 3B is a schematic cross-sectional view of the same. The light guide panel 120 has a substantially rectangular form as shown in FIG. 3A and has an upper face 121 and a lower face 122 as shown in FIG. 3B. The light guide panel 120 is made of an optically transmissive material such as acrylic resin and has a plate-like form, and its thickness is in the range from 1.0 mm to 0.2 mm. FIG. 3A is a plan view illustrating the lower face of the light guide panel 120 for clarification purposes.

In FIG. 3B, a cross section of the light guide panel 120 is substantially rectangular, and an inclined plane 129 is formed from the light incoming plane 125 toward the light outgoing plane 121. This inclined plane 129 is effective when the thickness of the LED 150 is larger than the thickness of the light outgoing plane of the light guide panel, and the inclined plane 129 guides the light incoming from the light incoming plane 125 having a larger thickness than that of the light outgoing plane 121 toward the light outgoing plane 121.

FIG. 3 shows positional relations among the light guide panel 120, the LED 150, and the flexible substrate 160. The light incoming plane 125 is provided on at least one side of the light guide panel 120, and a plurality of LEDs 150 are provided at positions adjacent to the light incoming plane 125. The LEDs 150 are arranged in the lower side of the flexible substrate 160 along the light incoming plane 125.

An adhesive sheet 190 is provided on the side of the light guide panel 120 of the flexible substrate 160, and the LED 150 is positioned with respect to the light incoming plane 125 by adhering and fixing the flexible substrate 160 to a convex portion 220 of the light guide panel 120.

The inclined plane 129 is formed at a place adjacent to the light incoming plane 125. Furthermore, the flexible substrate 160 is flexible. However, since the overlaid area of the inclined plane 129 with the flexible substrate is small, it is difficult to fold the flexible substrate 160 and fix the folded flexible substrate 160 with the adhesive sheet 190 to the inclined plane 129. In addition, a position of the LED 150 may move after packaging due to a stress generated by folding. To prevent the trouble as described above, the convex portions 220 are formed in the light guide panel 120 along the side faces of the LEDs 150, and the adhesive sheets 190 are provided between the convex portions 220 and the flexible substrate 160.

Next, description is provided for a light beam 131 radiated from the LED 150 with reference to FIG. 3B. The light beam 131 radiated from the LED 150 goes into the light guide panel 120 from the light incoming plane 125.

The upper face 121 and the lower face 122 of the light guide panel 120 are perpendicular to the light incoming plane 125, respectively, and a V-shaped groove 126 is provided as a reflection section on the lower face 122. The light beams coming into the inside of the light guide panel 120 move forward in the light guide panel 120 being totally reflected on the upper face 121 and the lower face 122 of the light guide panel 120 repetitively. A portion of the light beam propagating in the light guide panel 120 is reflected toward the upper face 121 at the grooves 126 provided on the lower face 122 and goes out through the upper face 121. Although the V-shaped groove is described as an example of a reflection section, there is no specific restriction over the form of the groove 126 so long as the light beams propagating forward in the light guide panel are reflected toward the upper face 121; white dots may be used instead, for instance, by printing for the same purpose.

Figure 4A:
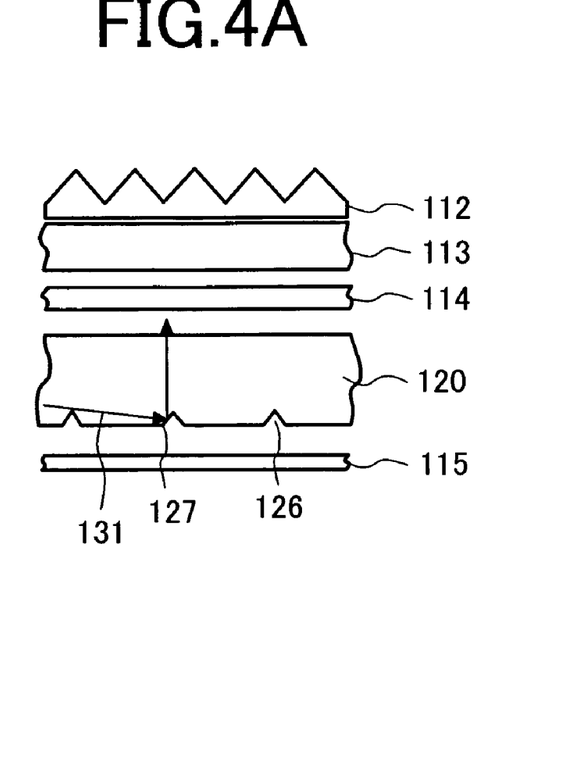
FIGS. 4A and B are schematic cross-sectional views illustrating propagation of a light beam through the light guide panel of the liquid crystal display device according to the embodiment of the present invention.
Figure 4B:
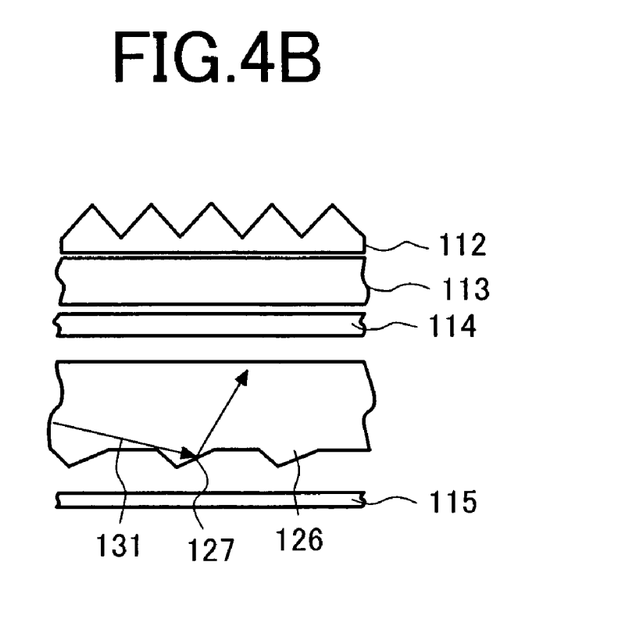

Next, description is made for the light beam reflected by the groove 126 with reference to FIG. 4. FIG. 4A shows a case in which the groove 126 is concave, while FIG. 4B shows a case where the groove 126 is convex. The groove 126 has a reflection plane (also referred to as inclined plane) 127, and the reflection plane 127 is inclined by 1 to 35 degrees with respect to the lower face 122. The light beams reflected at the reflection plane 127 are reflected toward the upper face 121 of the light guide panel 120, and an angle of reflection toward the upper face 121 is adjusted so that the reflected light beams can go out through the upper face 121.

Furthermore, as shown in FIG. 4B, on occasion the light beam may be reflected on the reflection plane 127 so that the it extends outward at a large angle with respect to the direction vertical to the upper face 121 of the light guide panel 120 (at a blunt angle with respect to the upper face 121). In response to this, prism sheets 113 and 112 are provided on the light guide panel 120 so that the light beam moving outward is reflected toward a liquid crystal panel (not shown). Reference numeral 114 denotes a diffusion sheet, and reference numeral 115 denotes a reflection sheet.

Figure 5:
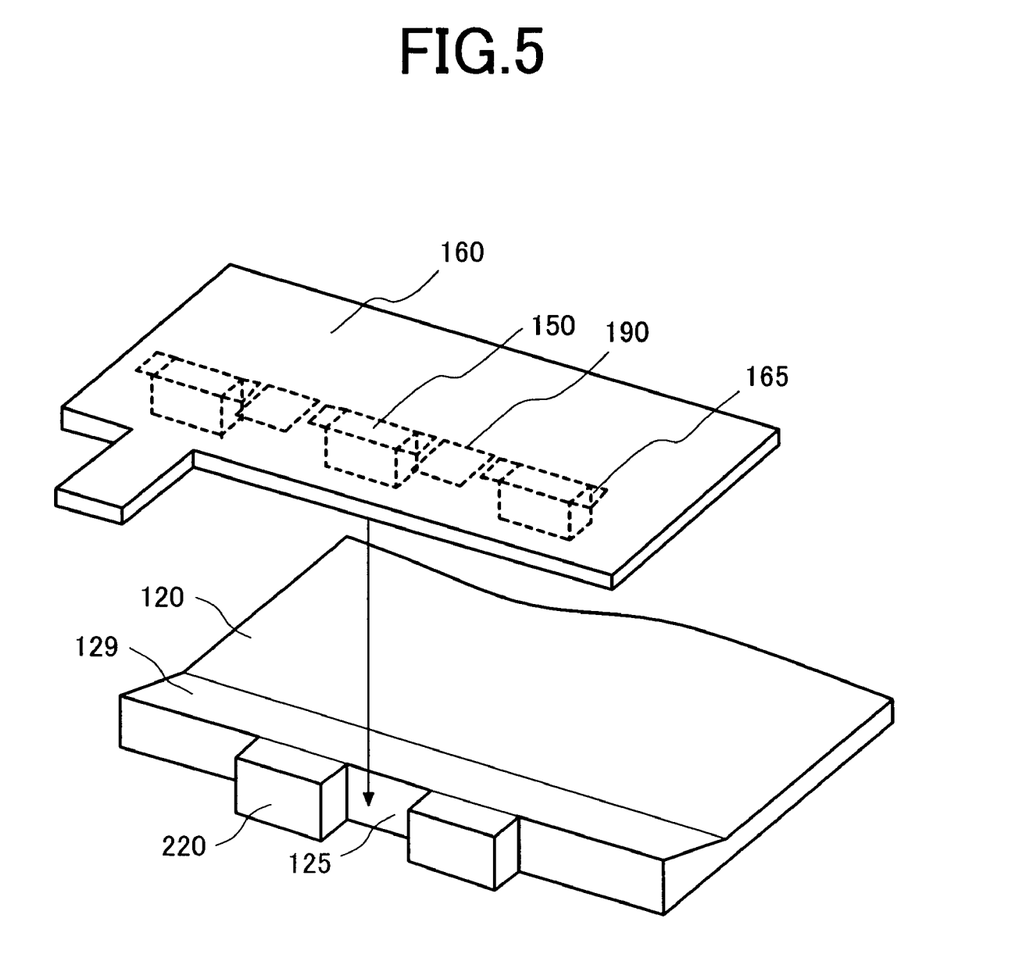
FIG. 5 is a schematic illustrating positions of the light guide panel and light-emitting diode of the liquid crystal display device according to the embodiment of the present invention.

Next, a process for combining a flexible substrate 160 with the LED 150 mounted thereon with the light guide panel 120 is described with reference to FIG. 5. In FIG. 5, the optical sheet placed on the light guide panel 120 is eliminated to clarify the positional relation between the flexible substrate 160 and the light guide panel 120.

First, the LED 150 is mounted on the flexible substrate 160 by being connected to a connection pad 165 formed on the flexible substrate 160 with such a material as solder. Although wiring for supplying power to each LED 150 is provided on the flexible substrate 160, the wiring is not shown in FIG. 5 for simplicity.

The adhesive sheet 190 is provided on the flexible substrate 160 with the LED 150 mounted thereon, and the flexible substrate 160 is attached with the adhesive sheet 190 to a convex portion 220 of the light guide panel 120. If the position of the LED 150 easily changes with respect to the light incoming plane 125 of the light guide panel 120 due to vibration or the like, brightness of the light which comes into the light guide panel 120 fluctuates, which spoils the stability of display performance. To prevent the trouble as described above, the flexible substrate 160 is fixed to the convex portion 220 of the light guide panel 120 with the adhesive sheet 190 or the like.

The adhesive sheet 190 has a multilayer structure in which an adhesive member is provided on a resin substrate; also, it is possible to provide a reflection area on the substrate using paint or a material such as silver.

By forming a structure in which the light guide panel 120 and the flexible substrate 160 are integrated with each other by using the adhesive sheet 190, it becomes possible to check whether the LED 150 is placed at a right position with respect to the light incoming plane 125 of the light guide panel 120. In other words, if the flexible substrate 160 and the light guide panel 120 are packaged discretely in the back light during the production process and an attempt is made afterward to check a position of the LED 150 with respect to the light incoming plane 125, that attempt would fail because the LED 150 and the light incoming plane 125 are hidden by other components.

Figure 6:
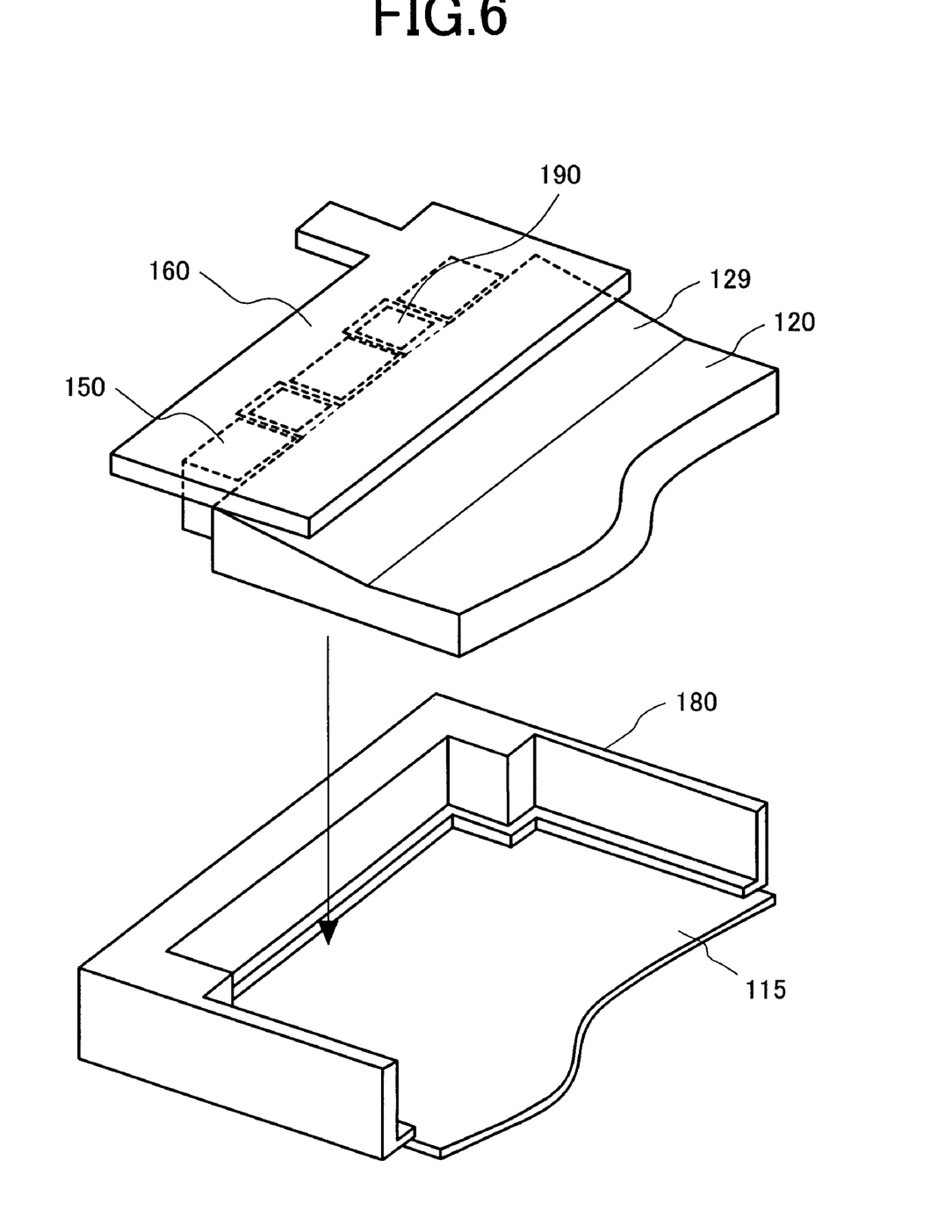
FIG. 6 is a schematic showing a method of packaging the light guide panel in the liquid crystal display device according to the embodiment of the present invention.

Next, description is made for a process of packaging the integrated component between the light guide panel 120 and the flexible substrate 160 in a mold 180. The mold 180 has a function as an accommodating section for the back light 110. Housed and retained in the mold 180 are the light guide panel 120 and the flexible substrate 160.

The mold 180 also has a function for preventing leakage of light and covers the light guide panel 120. The mold 180 has an opening on the side facing the liquid crystal panel so that a light beam from the back light 110 is radiated out of the opening to irradiate the liquid crystal panel.

First, a reflection sheet 115 is placed on the mold 180, and the light guide panel 120 and the flexible substrate 160 are placed over the reflection sheet 115. Also the configuration is allowable in which an opening is provided on a bottom face of the mold 180 and the reflection sheet 115 is fixed with an adhesive to the external side of the opening as shown in FIG. 6.

When the reflection sheet 115 is provided on the external side of the opening of the mold 180, it becomes possible to form a space between the LED 150 and the reflection sheet 115. Further, it becomes possible to reduce the possibility of contact between the LED 150 and the reflection sheet 115 due to thermal expansion of the LED 150.

Figure 7:
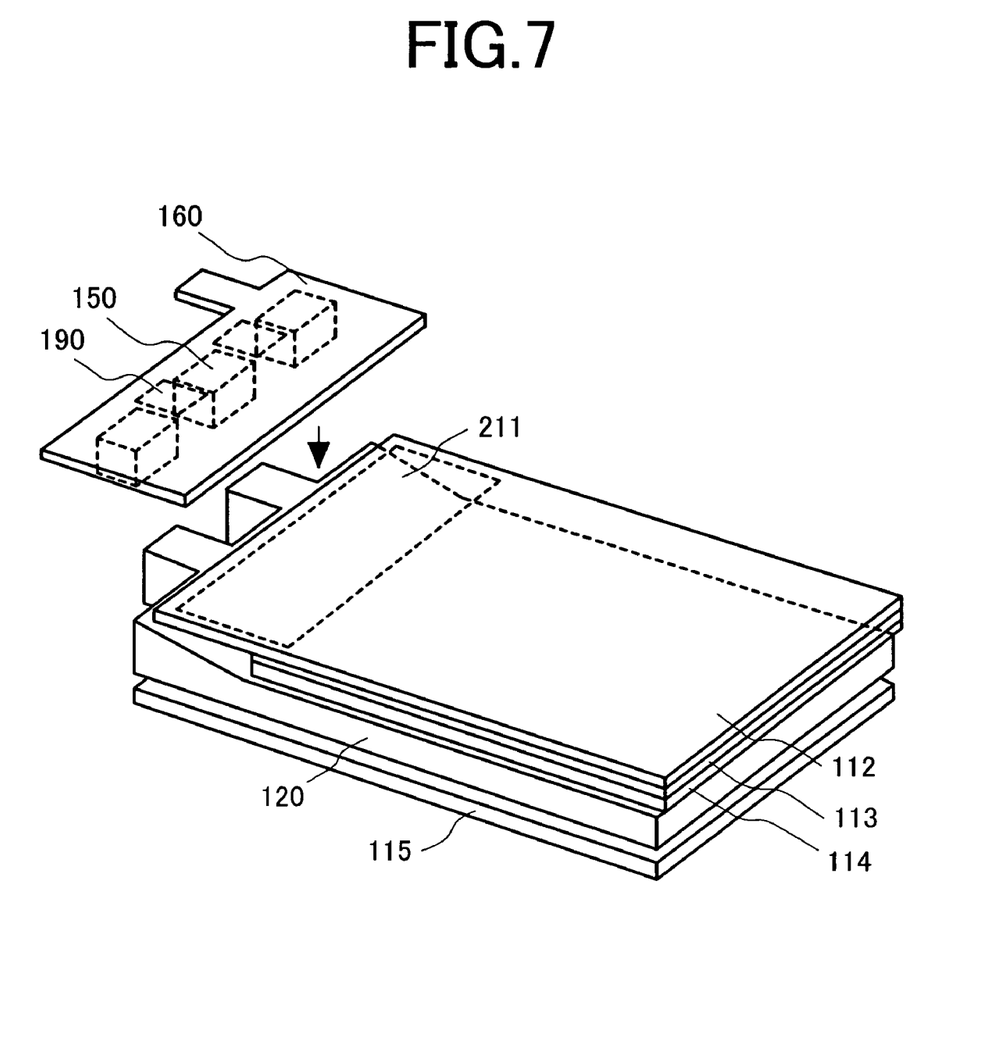
FIG. 7 is a schematic showing a method of packaging the light guide panel in the liquid crystal display device according to the embodiment of the present invention.

FIG. 7 shows a step of providing optical sheets such as the diffusion sheet 114, the lower prism sheet 113, the upper prism sheet 112, or the like on the light guide panel 120. The optical sheets are provided to efficiently irradiate the liquid crystal panel with the light beam radiated from the light guide panel 120, and the optical sheets are placed in order on the light outgoing plane of the light guide panel 120.

The optical sheets are arranged according to the light which comes out of the light outgoing plane of the light guide panel 120. Therefore, each of the optical sheets has the substantially same form and the substantially same size as those of the light outgoing plane of the light guide panel 120. In other words, because areas of each optical sheet are required to be minimized to lower product prices, each of the optical sheets has only to be of the substantially same size as that of the light outgoing plane of the light guide panel 120 to achieve the optical object as described above.

However, one of the optical sheets (the upper prism 112 in this embodiment) extends up to a position close to the LED 150 to form a colored area 211 with white ink on the light guide panel 120 side. The colored area 211 reflects a light beam coming out of the light guide panel 120 and returns the light beam toward the light guide panel 120 side.

Figure 8:
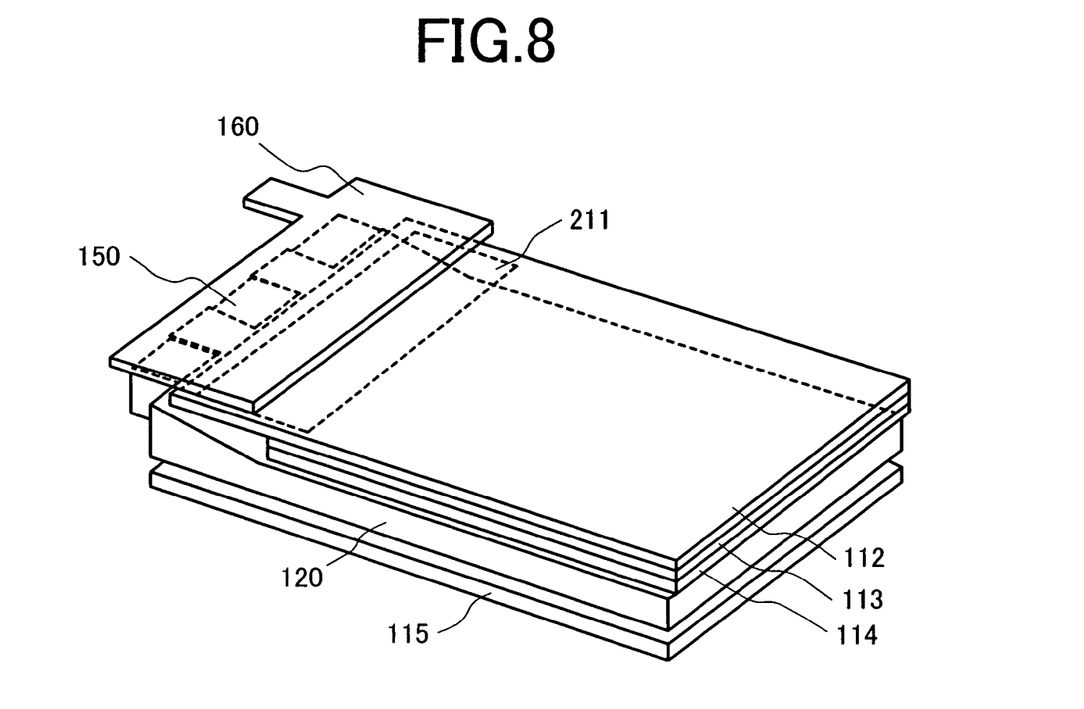
FIG. 8 is a schematic perspective view illustrating a back light of the liquid crystal display device according to the embodiment of the present invention.

FIG. 8 shows a state in which optical sheets such as the diffusion sheet 114, the lower prism sheet 113, and the upper prism sheet 112 are provided on the light guide panel 120 and the flexible substrate 160 is provided on the uppermost optical sheet.

The colored area 211 formed on the optical sheet (the upper prism sheet 112) is positioned between the light guide panel 120 and the flexible substrate 160. The light beam radiated from the light guide panel 120 is reflected by the colored area 211 toward the light guide panel 120 without being absorbed by the flexible substrate 160.

Figure 9:
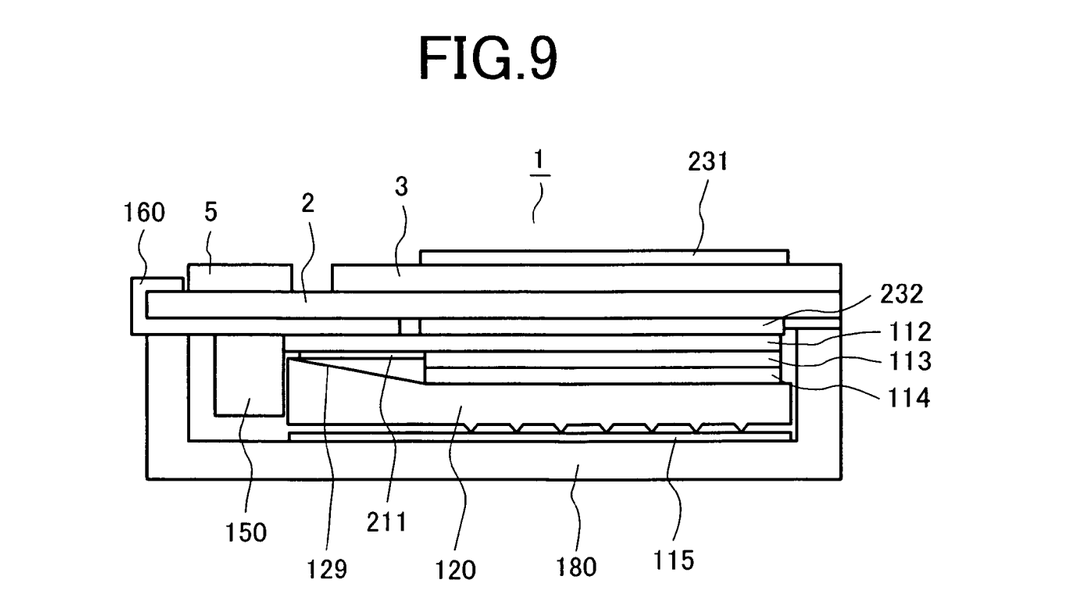
FIG. 9 is a schematic cross-sectional view illustrating the back light in the liquid crystal display device according to the embodiment of the present invention.

FIG. 9 is a cross-sectional view of a structure in which the light guide panel 120 and other related components are packaged in the mold 180 and the liquid crystal panel 1 is mounted thereon. The liquid crystal panel 1 has a structure in which the color filter substrate 3 is placed on the TFT substrate 2, and an upper polarization plate 231 and a lower polarization plate 232 are provided in the outer sides of the TFT substrate 2 and the color filter substrate 3.

The colored area 211 is provided on the optical sheet (upper prism sheet 112). The colored area 211 faces the inclined plane 129 of the light guide panel 120 and reflects the light beams radiated from the inclined plane 129 toward the light guide panel 120.

Figure 10:
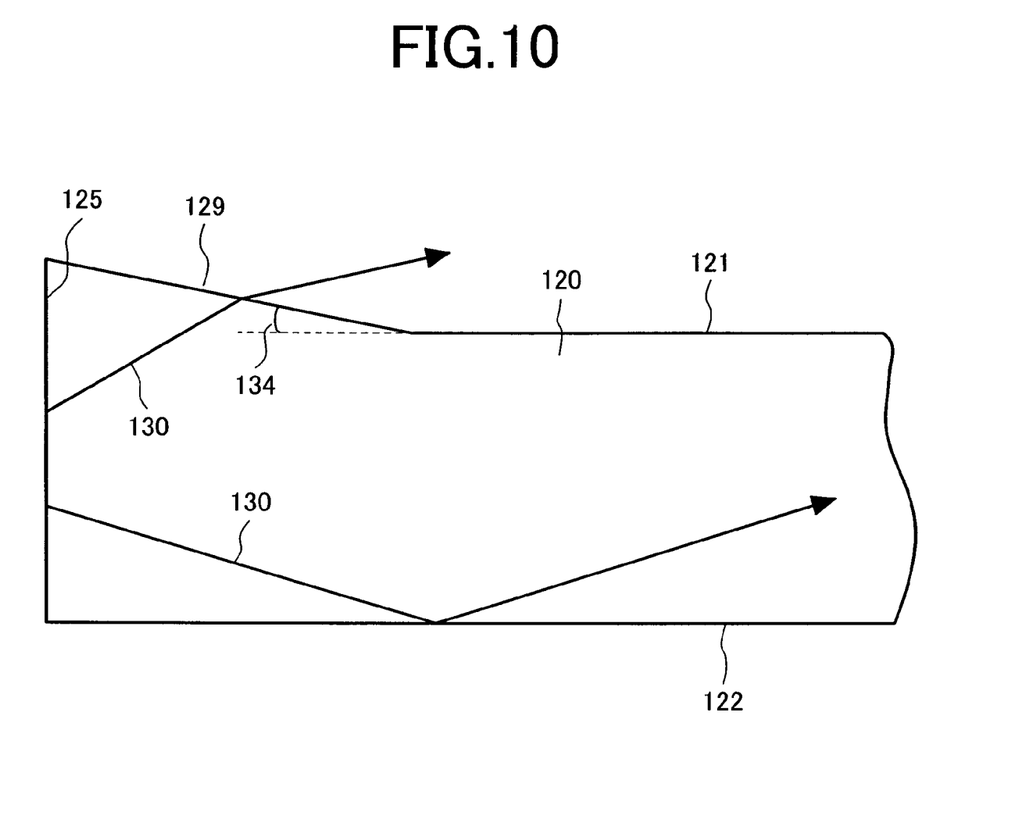
FIG. 10 is a schematic cross-sectional view illustrating propagation of light through the light guide panel of the liquid crystal display device according to the embodiment of the present invention.

Next, the light beam coming out of the inclined plane 129 is described with reference to FIG. 10. To simplify the description, it is assumed in FIG. 10 that the refraction index of the light guide panel 120 is 1.59. Therefore, the critical angle of the light beam with respect to normal line directions of the upper face 121 and the lower face 122 of the light guide panel 120 is 38.97 degrees.

The angle of a light beam 130 coming into the light guide panel 120 from the light incoming plane 125 with respect to normal line directions of the upper face 121 and the lower face 122 of the light guide panel 120 is more than 51.03 degrees, which is larger than the critical angle. Therefore, total reflection of the light beam is repeated.

However, when the inclined plane 129 is provided on the upper face 121 and the angle 134 between the inclined plane 129 and the upper face 121 is more than 12.06 degrees (=51.03 degrees−38.9 degrees), the light beam is not totally reflected at the inclined plane 129 and goes out of the light guide panel 120.

Therefore, when the angle 134 between the upper face 121 and the inclined plane 129 is more than 12.06 degrees, the colored area 211 is effective in again reflecting the light beam going out of the inclined plane 129 toward the light guide panel 120. That is, when the angle 134 between the upper face 121 and the inclined plane 129 is more than ((90 degrees−critical angle)−critical angle) degrees, the colored area 211 is effective.

The inclined plane 129 is provided to reduce the thickness of the light guide panel 120 in a section between the light incoming plane 125 and the upper face 121 when the thickness of the light guide panel 120 is smaller than that of the LED 150, which enables use of the light guide panel 120 with a smaller thickness.

Figure 11:
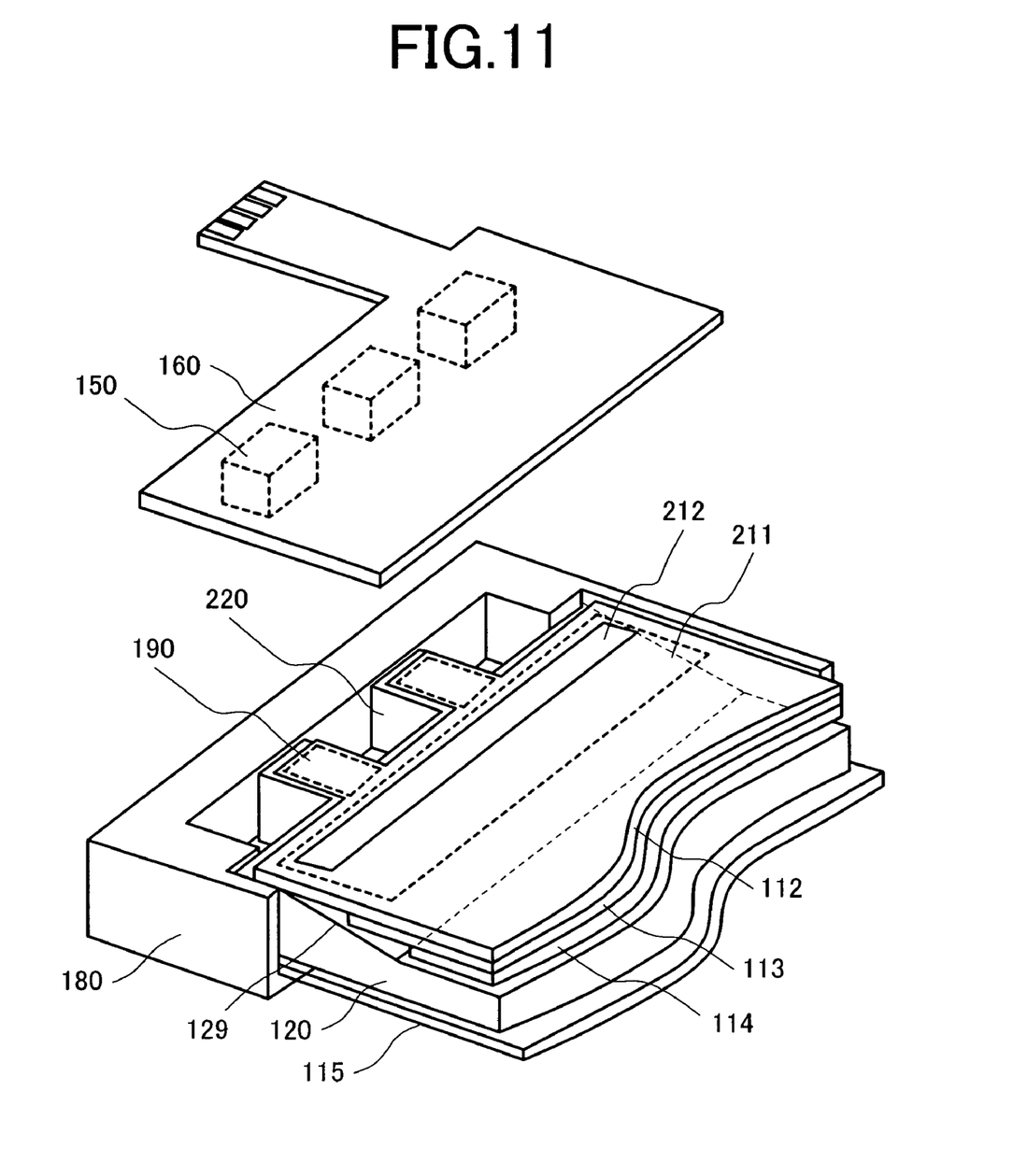
FIG. 11 is a schematic perspective view illustrating the back light of the liquid crystal display device according to the embodiment of the present invention.

FIG. 11 illustrates a state in which the optical sheet (upper prism sheet 112) extends up to the convex portion 220 of the light guide panel 120 and the upper prism sheet 112 is attached to the convex portion 220 with the adhesive member 190.

In the configuration shown in FIG. 11, the flexible substrate 160 and the upper prism sheet 112 are attached to each other by providing an adhesive layer 212 on the side opposite to the colored member 211 on the optical sheet. That is, with the configuration in which a light reflection section is provided with such a material as white paint on the light guide panel 120 side of the optical sheet and a multi-layered structure with the adhesive layer 212 is provided on the flexible substrate 160 side of the optical sheet, positional alignment with the flexible substrate 160 can easily be performed. It is to be noted that the adhesive member 190 for adhesion between the light guide panel 120 and the upper prism sheet 112 is provided on the convex portion 220.

Figure 12:
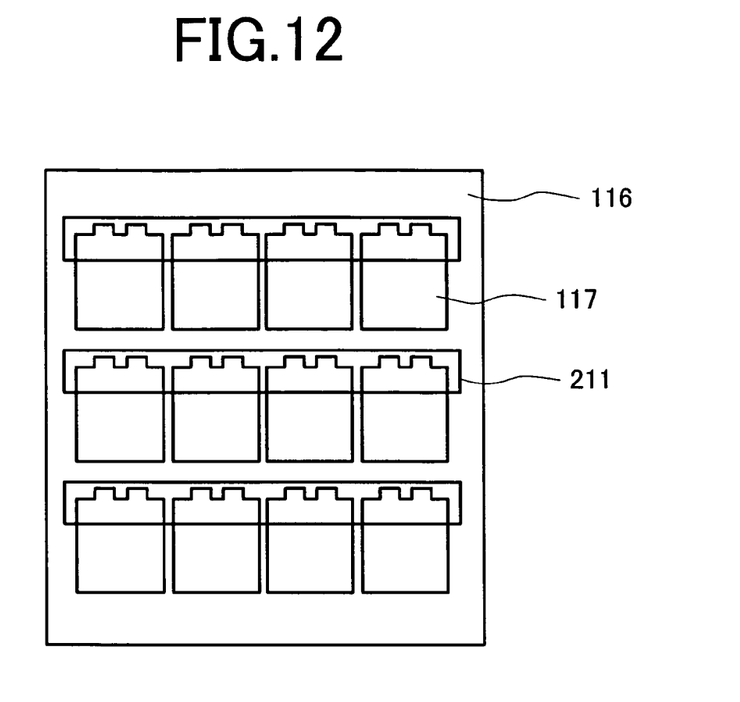
FIG. 12 is a schematic plan view illustrating an optical sheet of the liquid crystal display device according to the embodiment of the present invention.

Next, methods of forming the colored area 211 on an optical sheet 117 is described with reference to FIG. 12 and FIG. 13. In a method shown in FIG. 12, the colored area 211 is formed by printing or applying a suited material on a sheet-like base film 116 (a base material for the optical sheet). Then, the base film on which the colored area 211 is formed is stamped out in the form of the optical sheet 117. In the method shown in FIG. 12, a number of optical sheets 117 can be made from one sheet of the base film 116.

Figure 13:
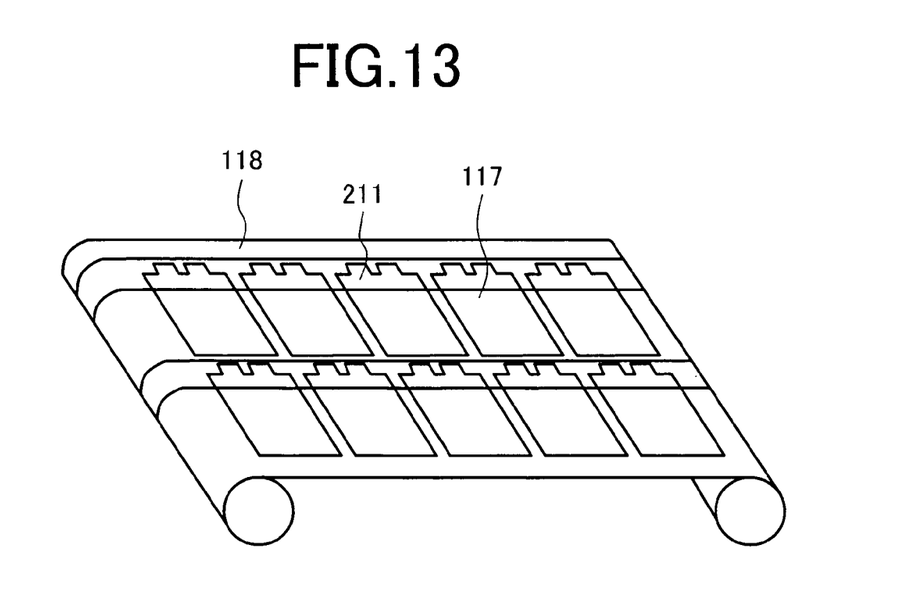
FIG. 13 is a schematic perspective view illustrating the optical sheet of the liquid crystal display device according to the embodiment of the present invention.

In a method shown in FIG. 13, the colored areas 211 are formed on a rolled base film 118 in advance, or they are formed during the same process as the stamping-out process, and the optical sheets 117 are stamped out with the base film 118 with the colored areas 211 formed thereon rolled up.

The use of the rolled base film 118 makes storage of the base film 118 easy; further, it improves work efficiency because the optical sheets 117 can be stamped out successively during the manufacturing process.

Figure 14:
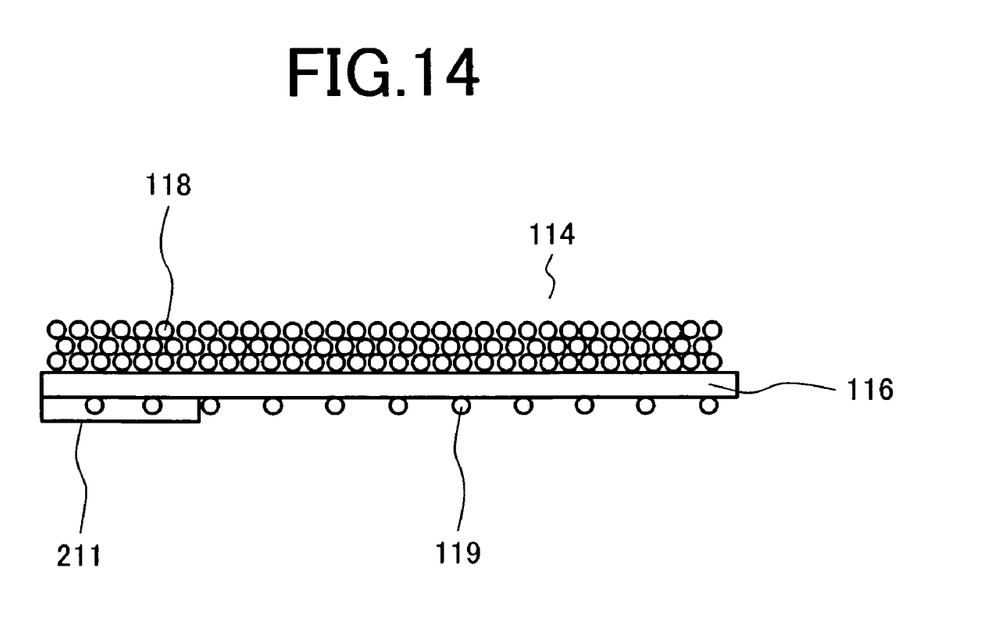
FIG. 14 is a schematic cross-sectional view illustrating the optical sheet of the liquid crystal display device according to the embodiment of the present invention.

FIG. 14 illustrates the colored area 211 provided on the diffusion sheet 114 formed by applying resin particles 118 on the resin-made base film 116. The resin particles 118 are applied on the diffusion sheet 114 shown in FIG. 14. The moving directions of light beams are diffused by the light beams being refracted with the resin particles 118. The resin particles 118 are made of resin having the same refraction index as that of the base film 116. Resin particles 119 for preventing adhesion are provided on the surface opposite to that on which the resin particles 118 for diffusion are provided, and the colored area 211 is provided on the same surface.

In the description above, it is stated that the colored area 211 is formed on the light-guide-panel-side surface of optical sheets such as the prism sheet 112 or the diffusion sheet 114. However, the same effect can be obtained even when the colored area 211 is formed on the surface of the optical sheet opposite to that facing the light guide panel 120, for the thickness of the prism sheet 113 or the diffusion sheet 114 is very small, namely about 50 μm.

What is claimed is:
1. A liquid crystal display device comprising:
   a liquid crystal panel;
   a back light for irradiating the liquid crystal panel with light;
   a light-emitting element provided in the back light;
   a light guide panel which light from the light-emitting element enters; and
   a flexible substrate on which the light-emitting element is mounted;

wherein the light guide panel has a main surface out of which light goes, a light-incoming surface intersecting with the main surface, and an inclined portion formed between the light-incoming surface and the main surface;

a thickness of the inclined portion decreases along a direction from the light-incoming surface toward the main surface;

a prism sheet is placed on the main surface and the inclined portion; and a reflection area is formed on a side of the prism sheet adjacent to the inclined portion, and the flexible substrate overlays a surface of the prism sheet that is opposite from the reflection area.

2. The liquid crystal display device according to claim 1, wherein the light-emitting element is a light-emitting diode (LED).

3. The liquid crystal display device according to claim 1, wherein the reflection area of the prism sheet is formed with white paint.

4. The liquid crystal display device according to claim 1, wherein an adhesive material is provided in the reflection area.

5. A liquid crystal display device comprising:
a liquid crystal panel; and
a planar lighting unit for irradiating the liquid crystal panel with light,
wherein the planar lighting unit has a light emitting element, a circuit board on which the light emitting element is mounted, and a light guide panel for irradiating the liquid crystal panel with light from the light emitting element;
the light guide panel has an upper face formed to face the liquid crystal panel, a side face intersecting with the upper face, and an inclined portion formed between the side face and the upper face;
a thickness of the inclined portion decreases along a direction from the side face toward the upper face;
a prism sheet with a reflection area formed in a portion thereof is provided above the inclined portion; and
the circuit board overlays the prism sheet where the reflection area is formed.

6. The liquid crystal display device according to claim 5, wherein the light emitting element is an LED.

7. The liquid crystal display device according to claim 5, wherein an adhesive member is provided between the reflection area and the circuit board.

8. The liquid crystal display device according to claim 5, wherein the reflection area on the prism sheet is made of white paint.

9. A liquid crystal display device comprising:
a liquid crystal panel; and
a planar lighting unit for irradiating the liquid crystal panel with light;
wherein the planar lighting unit has:
a light emitting element;
a circuit board on which the light-emitting element is mounted; and
a light guide panel for irradiating the liquid crystal panel with light from the light-emitting element;
the light guide panel has an upper face facing the liquid crystal panel, a side face intersecting with the upper face, and an inclined portion formed between the side face and the upper face;
a thickness of the inclined portion decreases along a direction from the side face toward the upper face;
a prism sheet is provided above the upper face and the inclined portion of the light guide panel,
a reflection area is formed on a side of a light-guide-panel-side surface of the prism sheet that is adjacent to the inclined portion; and
the circuit board overlays a surface of the prism sheet that is opposite from the reflection area.

10. The liquid crystal display device according to claim 1, wherein the reflection area of the prism sheet is made of white paint.

11. The liquid crystal display device according to claim 9, wherein the light emitting element is an LED.

12. The liquid crystal display device according to claim 9, wherein an adhesive member is provided on the surface of the prism sheet opposite to that on which the reflection area is formed; and
the circuit board is adhered to the adhesive member.

* * * * *